(12) United States Patent
Garala (10) Patent No.: US 6,561,739 B1
(45) Date of Patent: May 13, 2003

(54) LOAD TRANSPORTING MODULAR PLATFORM SYSTEM

(75) Inventor: Himatlal J. Garala, Sterling, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 12 days.

(21) Appl. No.: 09/985,960

(22) Filed: Oct. 25, 2001

(51) Int. Cl.[7] .................................................. B60P 7/08
(52) U.S. Cl. ............................. 410/46; 410/35; 410/52
(58) Field of Search ........................... 410/31, 32, 35, 410/46, 52; 108/64, 51.11, 180, 158.12; 248/346.02; 52/589.1, 588.1

(56) References Cited

U.S. PATENT DOCUMENTS

| | | | |
|---|---|---|---|
| 4,322,192 A | * | 3/1982 | Zavada et al. ................. 410/81 |
| 4,546,945 A | | 10/1985 | Nessfield |
| 4,629,379 A | * | 12/1986 | Harris et al. ................... 410/77 |
| 4,732,505 A | | 3/1988 | Gloystein |
| 5,167,479 A | | 12/1992 | Bott ............................ 410/121 |
| 5,424,118 A | * | 6/1995 | McLaughlin |
| 5,809,905 A | * | 9/1998 | John et al. |
| 5,887,529 A | * | 3/1999 | John et al. |
| 6,085,668 A | * | 7/2000 | Kanki |
| 6,471,456 B2 | * | 10/2002 | Wassick ....................... 410/46 |

* cited by examiner

Primary Examiner—Stephen T. Gordon
(74) Attorney, Agent, or Firm—Jacob Shuster (57) ABSTRACT

Connector housings attached to modules are received within aligned socket formations attached to the modules held assembled therewith forming a platform by joints established between such connector housings and the socket formations by selectively controlled locking balls projected through side walls of the connector housings into the socket formations. Such projection of the balls is guided through sleeves adjustably positioned on the housing side walls.

11 Claims, 10 Drawing Sheets

FIG. 15

LOAD TRANSPORTING MODULAR PLATFORM SYSTEM

The present invention relates in general to a modular platform type of load transporting arrangement.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Current types of load transport arrangements involve deployment of platform forming modules, such as the lighterage systems for transporting army cargos such as tanks, trucks, vehicles, etc. between the decks of marine vessels and shore. Various operational and structural joint problems arise with respect to such modules during platform assemblage and use of the lighterage transport system, especially under ocean conditions. It is therefore an important object of the present invention to provide a modular platform type of load transport arrangement, wherein platform establishment is more readily achieved and maintenance of firm joints between platform modules is enhanced with reduced effort.

SUMMARY OF THE INVENTION

In accordance with the present invention, the joint connectors projecting from the ends of platform modules are received within aligned sockets mounted on the modules being firmly joined thereto by aligned locking balls projected from each joint connector through openings in side plates of the connector housing adjacent opposite longitudinal ends thereof. Projection of such locking balls is effected by manual rotation of a camshaft with reduced force to induce axial displacement relative thereto by means of camming wedges within each connector housing in engagement with pairs of the balls for guided displacement through laterally extending sleeves within the housing, adjustably secured to the side housing walls.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
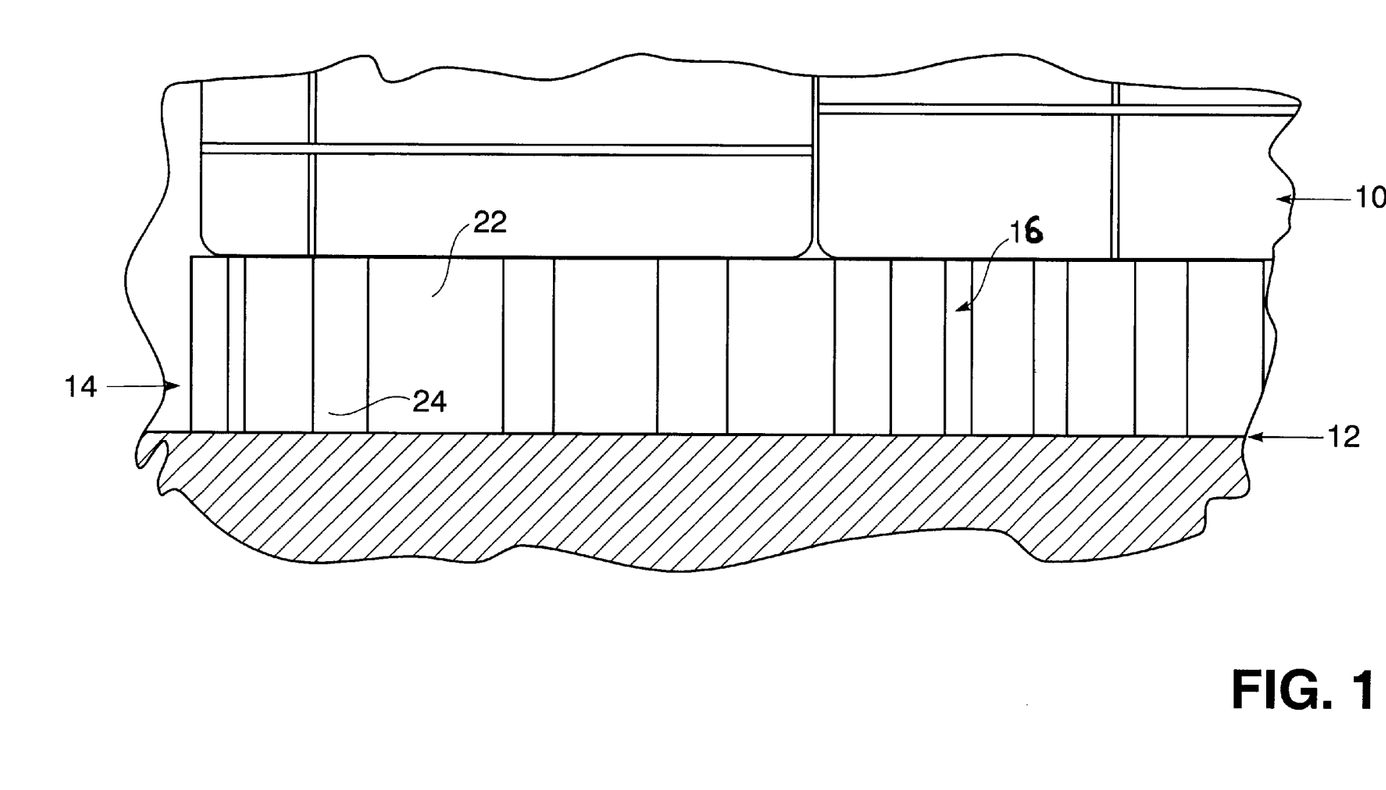
FIG. 1 is a partial side elevation view of a load carrying platform with which the present invention is associated.
Figure 2:
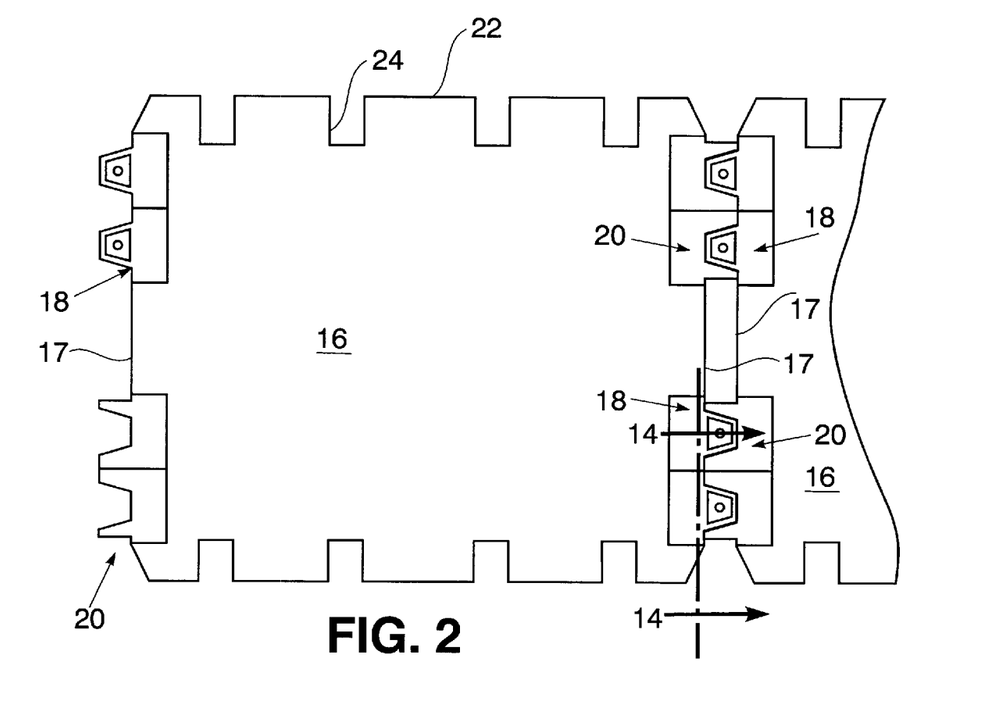
FIG. 2 is a partial plan view of the assembled platform shown in FIG. 1.
Figure 3:
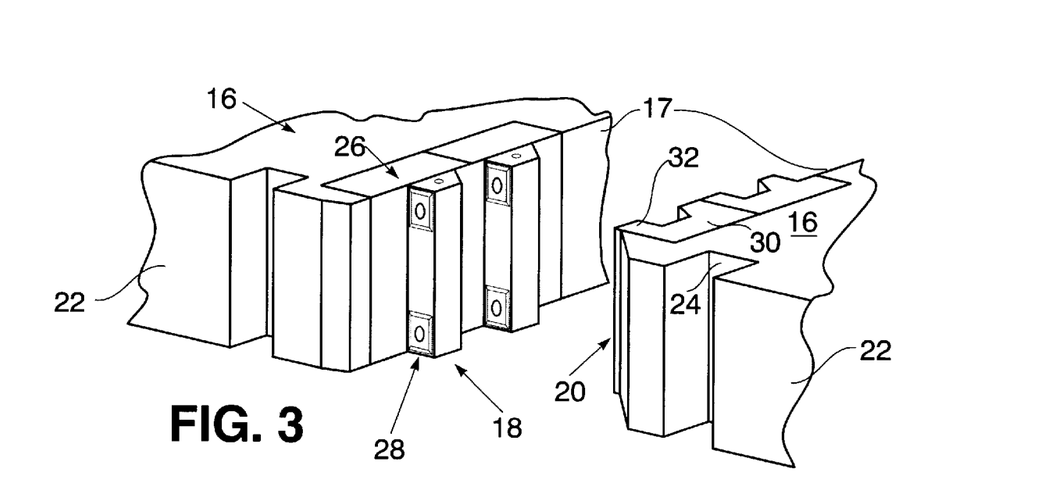
FIG. 3 is a partial perspective view of a portion of the platform shown in FIG. 2, disassembled with the disconnected modules thereof somewhat separated.

Referring now to the drawing in detail, FIG. 1 illustrates an assembly 10 of loads supported above a surface 12 on a platform 14, which is formed from an assembly of generally rectangular modules 16, as shown in FIG. 2. The opposite longitudinal end portions 17 of each of the platform modules 16 includes a pair of male connectors 18 attached thereto, laterally spaced from a pair of female connectors 20. Each pair of female connectors 20 on the ends of each of the modules 16 as shown in FIG. 2, are longitudinally aligned with a pair of the male connectors 18 on the ends of another of the platform modules assembled therewith. Thus, such alignment of the male and female connectors 18 and 20 accommodates interfitting reception of the male connectors 18 within the female connectors 20 to form connecting joints therewith as shown in FIG. 2. FIG. 3 shows such aligned connectors 18 and 20 separated from each other between closely spaced disassembled platform modules 16. Each of the modules 16 also includes along its opposite longitudinal sides 22, a plurality of spaced joint slots 24. Pursuant to the present invention, exceptionally firm joints are readily established between the longitudinal ends 17 of the platform modules 16 when assembled to form the platform 14, by virtue of the constructional attributes associated with the interfitting male and female connectors 18 and 20 as hereinafter pointed out.

Figure 4:
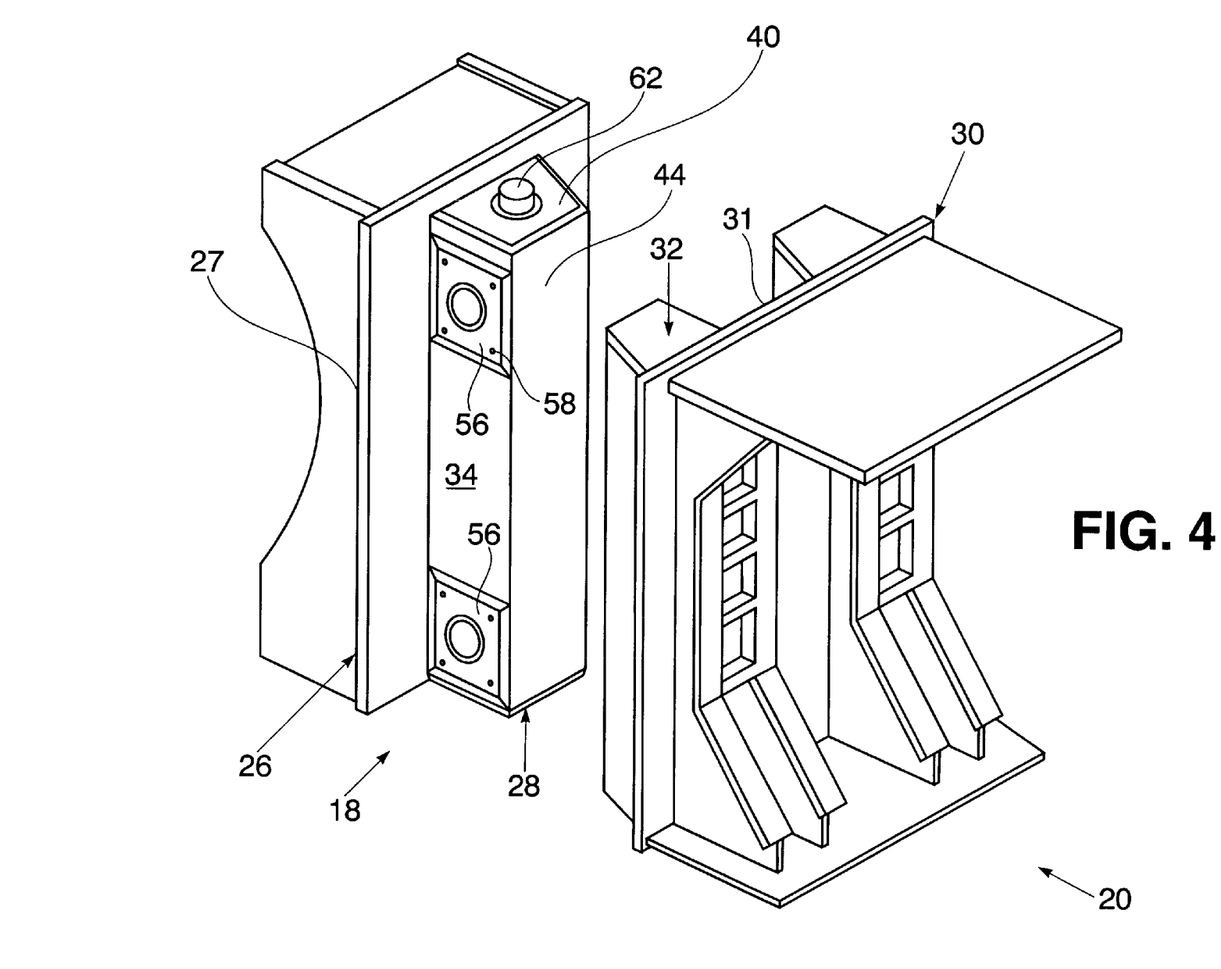
FIG. 4 is a perspective view of the disassembled module connectors associated with the modules shown in FIGS. 2 and 3.
Figure 5:
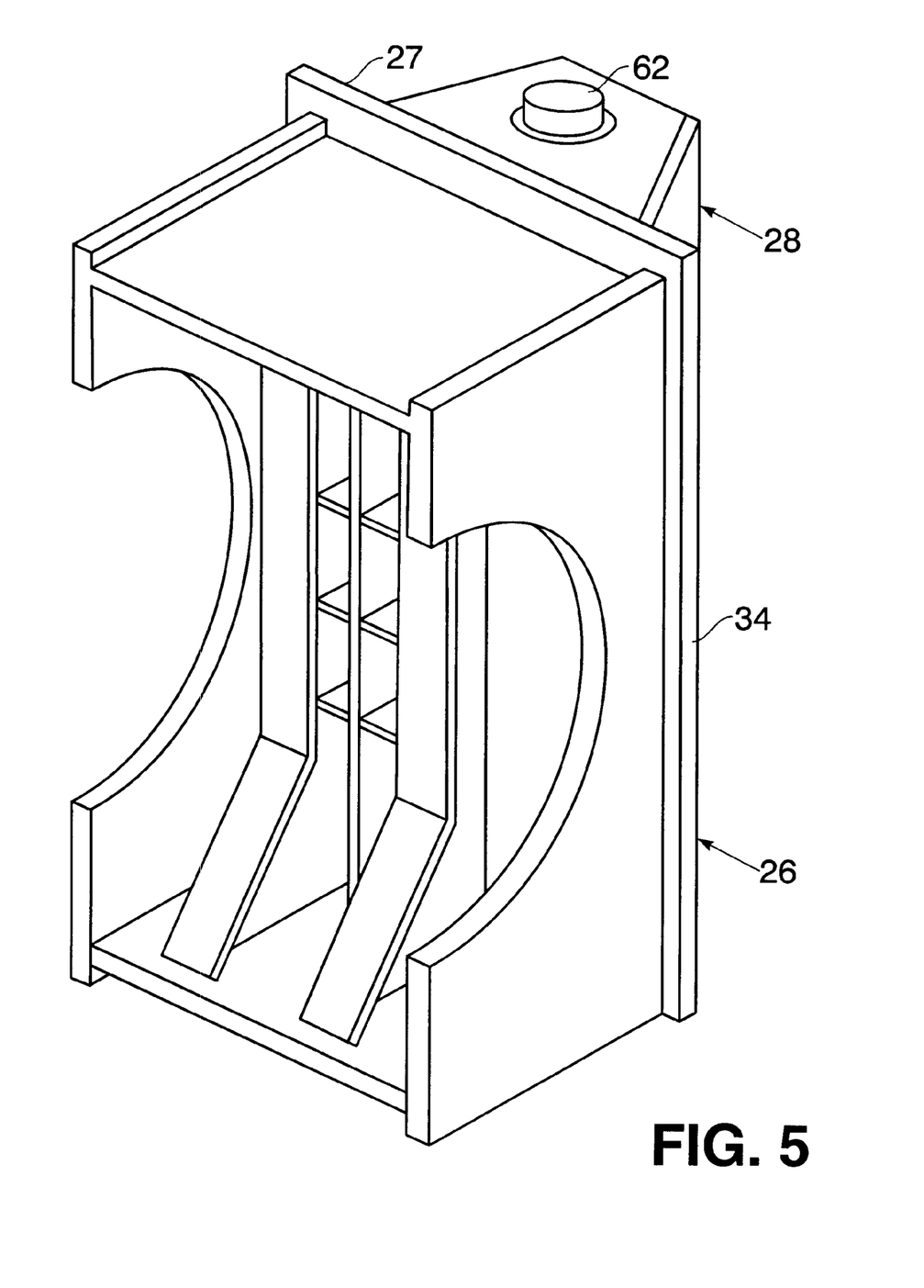
FIG. 5 is a perspective view of the male connector illustrated in FIG. 4, as viewed from a side opposite to that shown in FIG. 4.
Figure 6:
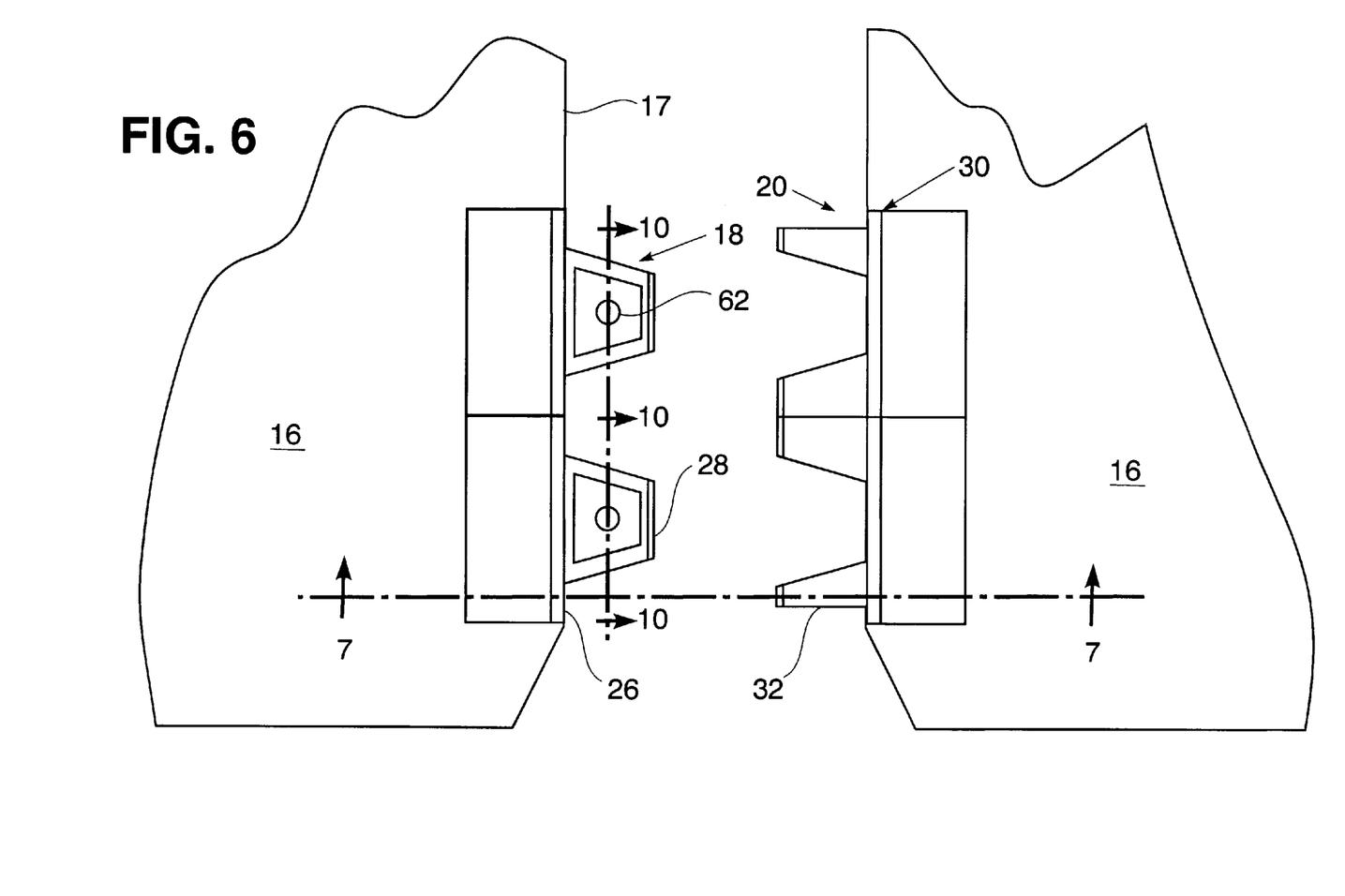
FIG. 6 is a partial top plan view of the disassembled platform modules with the separated connectors in alignment with each other as shown in FIG. 3.
Figure 7:
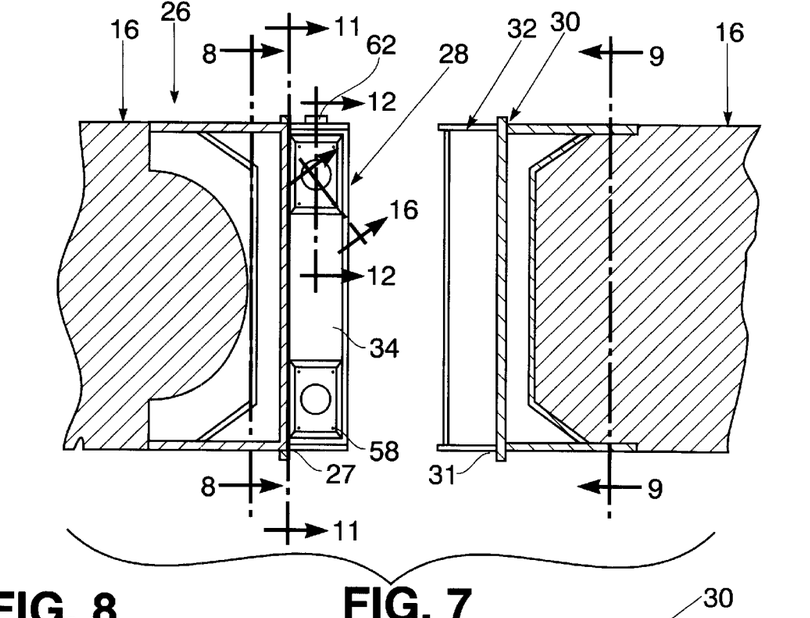
FIG. 7 is a section view taken substantially through a plane indicated by section line 7—7 in FIG. 6.
Figure 8:
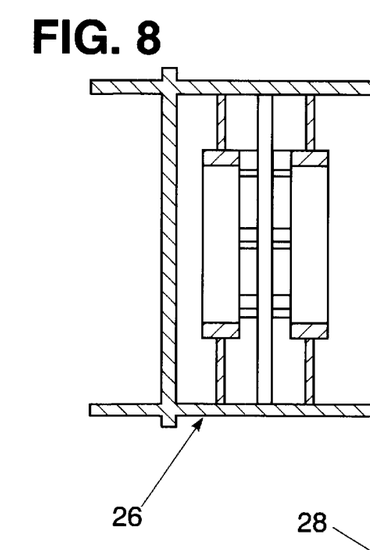
FIG. 8 is a section view taken substantially through a plane indicated by section line 8—8 in FIG. 7.
Figure 9:
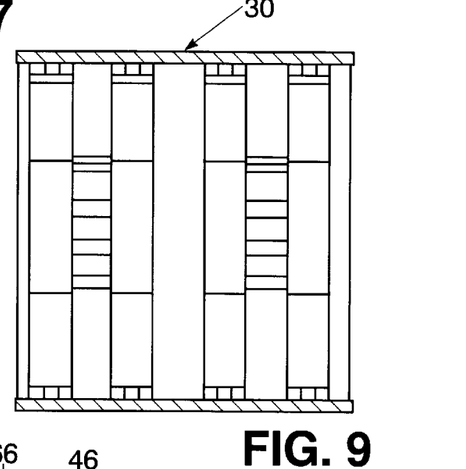
FIG. 9 is a section view taken substantially through a plane indicated by section line 9—9 in FIG. 7.

Referring now to FIGS. 4–13, each of the male connectors 18 includes a backing structure 26 attached to the body of its module 16 having a panel 27 from which a connecting projection 28 extends, while the female connector 20 includes a backing structure 30 having a panel 31 from which a pair of socket forming receptors 32 project. As shown in FIGS. 4 and 5, the backing structures 26 and 30 are internally reinforced. As to the connecting projection 28 through which module joints are established, attention is invited to FIGS. 7, 10, 11, 12 and 13 depicting essential features of the present invention as hereinafter pointed out.

Figure 10:
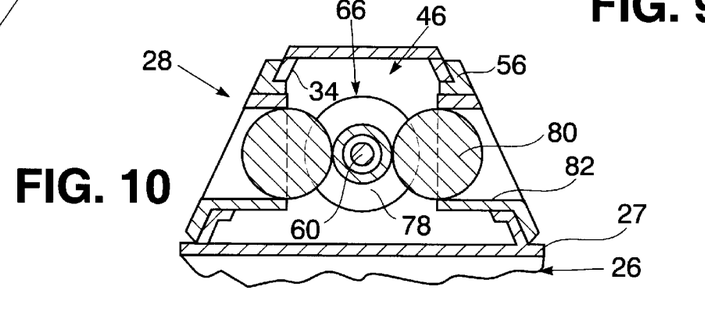
FIG. 10 is a section view taken substantially through plane indicated by section line 10—10 in FIG. 6.
Figure 11:
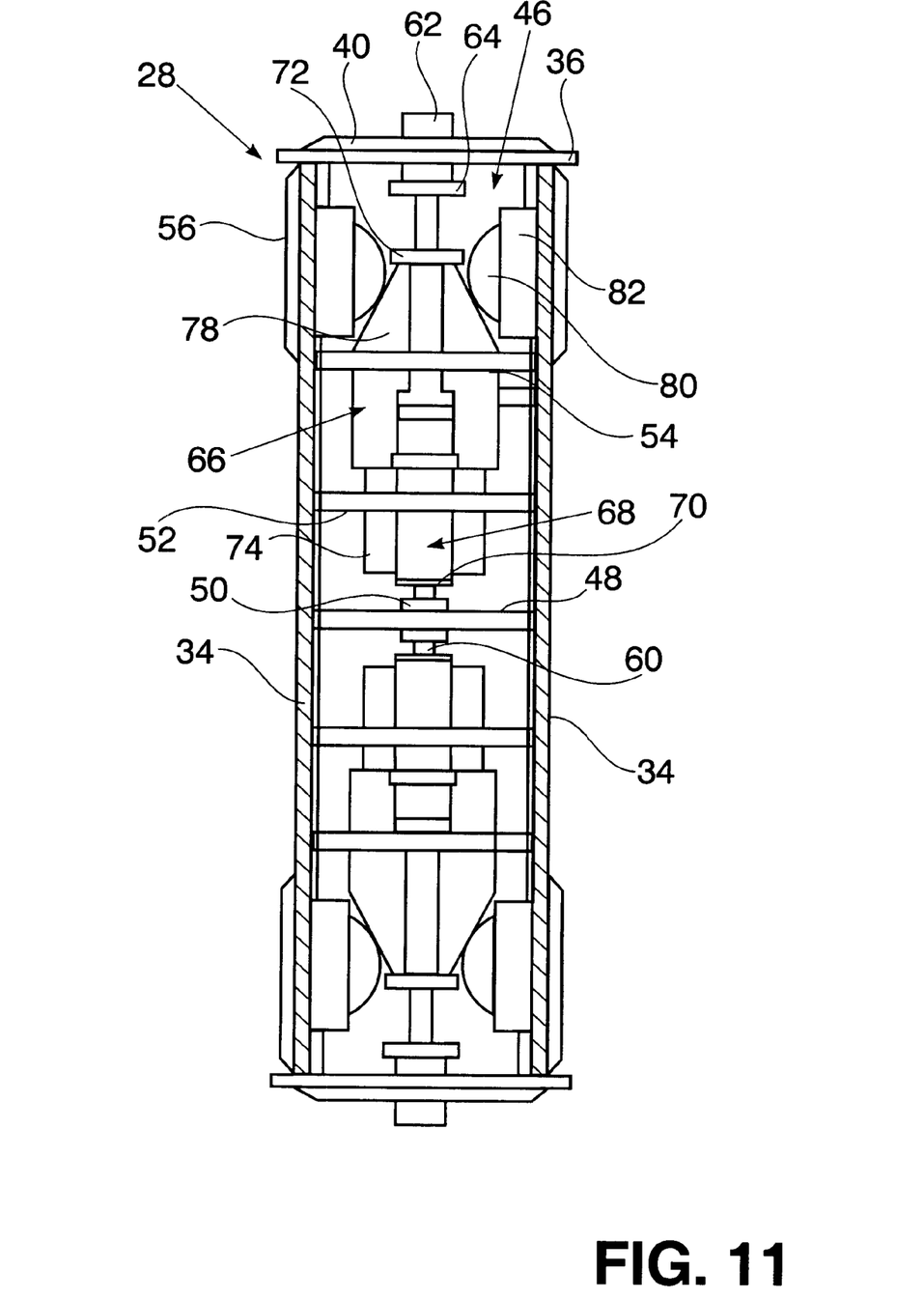
FIG. 11 is a section view taken substantially through a plane indicated by section line 11—11 in FIG. 7, with the male connectors in retracted condition.
Figure 11A:
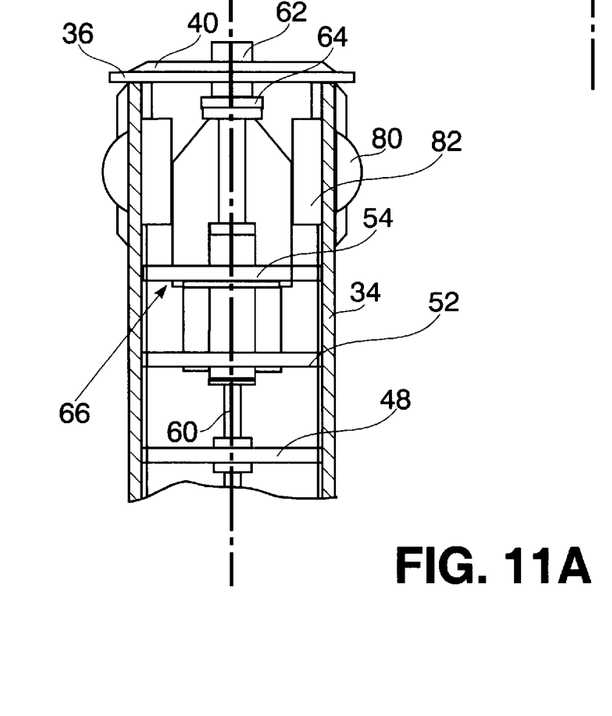
FIG. 11A is a section view corresponding to that of FIG. 11, but showing the male connector in extended condition.
Figure 12:
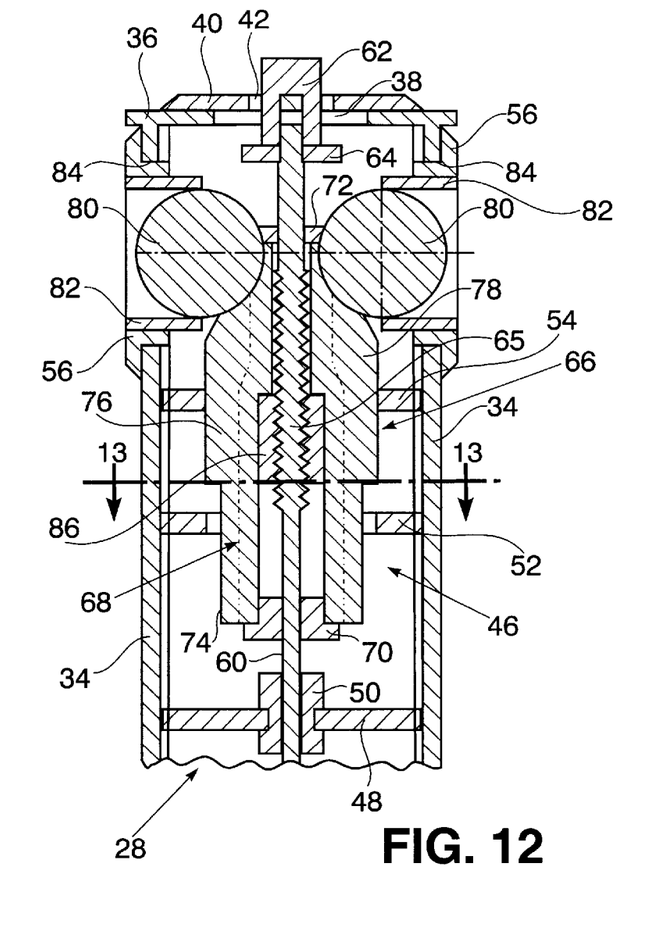
FIG. 12 is an enlarged partial section view taken substantially through a plane indicated by section line 12—12 in FIG. 7, showing a male connector in the retracted condition.

As shown in FIGS. 4, 7, 10, 11, 12 and 13, each of the male connecting projections 28 has a housing formed between converging side walls 34 projecting from the panel 27 of the backing structure 26. Such housing sides 34 are also interconnected at the top and bottom by end walls 36 having enlarged openings 38 therein, as shown in FIG. 12. End caps 40 are secured to such end walls 36 closing the openings 38 to centrally position bearings 42 thereat in alignment at opposite ends of the housing for establishment of a rotational axis as hereinafter pointed out. The front of such housing is closed by a face plate 44 to form a housing enclosure for a manually operated joint locking mechanism 46, as shown in FIGS. 10–13. The housing is internally stiffened by axially spaced plates, including a central bearing plate 48 supporting a bearing 50 in axial alignment with the end cap bearings 42, as well as stiffening plates 52 and 54 with central openings therein as shown in FIG. 12. Rectangular side plates 56 are adjustably secured to the converging housing sides 34 at opposite ends thereof by bolts 58 as shown in FIG. 4, to close openings formed thereat in the housing sides 34 to complete the housing enclosure in cooperation with operation of the joint locking mechanism 46.

Figure 13:
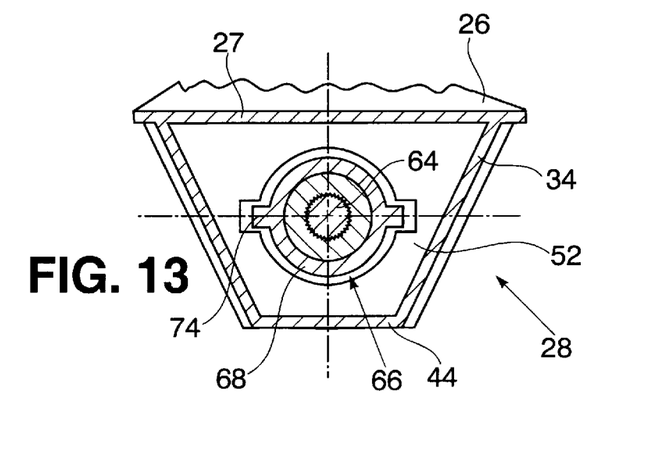
FIG. 13 is a partial section view taken substantially through a plane indicated by section line 13—13 in FIG. 12.

With continued reference to FIGS. 11, 12 and 13, the joint locking mechanism 46 includes a camshaft 60 centrally journaled within the housing enclosure by the plate supported bearing 50 and the end cap bearings 42. A manual wrench engageable actuator 62 is connected to one axial end of the camshaft 60 and projects through the opening in the housing end cap 40 from a stop disc 64 threadedly secured to the camshaft 60 within the housing. A spirally threaded section 65 of the camshaft 60 axially extends locationally between the middle of the housing side plates 56 and the internal stiffening plates 52.

While the camshaft 60 is rotationally supported by the bearings 50 and 42 in an axially fixed position within the housing enclosure, a wedge element 66 is slidably mounted thereon for axial displacement in response to rotation of the camshaft 60. Such wedge element 66 includes a radially inner tubular portion 68 with axial sections of decreasing diameter between one axial end sealed onto the camshaft 60 by an end seal 70, with its opposite axial end sealed to the camshaft 60 by an end seal 72. Camming ribs including sections 74 project laterally from the tubular portion 68 of the wedge element 66, extending axially from the end seals 70 toward diametrically larger rib sections 76 from which converging rib section 78 extend axially, terminating at the end seals 72 in engagement with a pair of spherical balls 80. Thus, four balls 80 associated with each of the male connectors 18 are laterally displaceable by the rib sections 78 of the wedge elements 66, when one of them is displaced axially along the camshaft 60 toward the stop disc 64. Such lateral movements of the balls 80 are guided by their slidable positioning within sleeves 82 held fixed to the housing enclosure sides 34 in adjusted positions by the bolts 58 in the side end plates 56.

Lateral displacement of the balls 80 from their retracted positions as shown in FIGS. 10, 11 and 12, by the rib sections 78 of the wedge elements 66, is effected by axial displacement of the wedge elements 66 along the axially fixed camshaft 60. Toward that end, internally threaded sleeves 86 are threadedly mounted on the threaded sections 65 of the camshaft 60, as shown in FIG. 12, for axial displacement in response to rotation of the camshaft 60. Such sleeves 86 are received within the tubular portions 68 of the wedge elements 66 so as to transfer its axial displacement by rotation of the camshaft 60 to the wedge elements 66.

Figure 14:
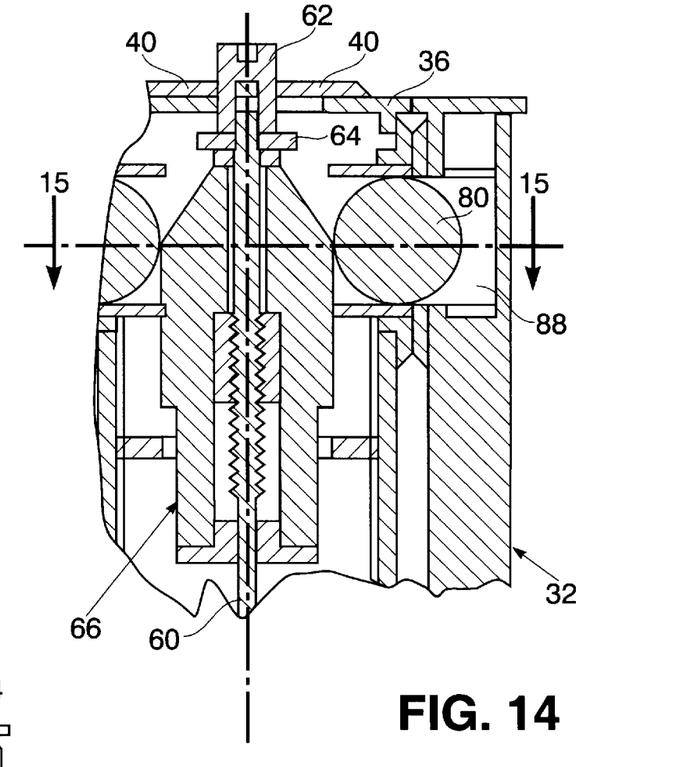
FIG. 14 is a partial section view taken substantially through a plane indicated by section line 14—14 in FIG. 2, showing a male connector in its extended locking condition.
Figure 15:
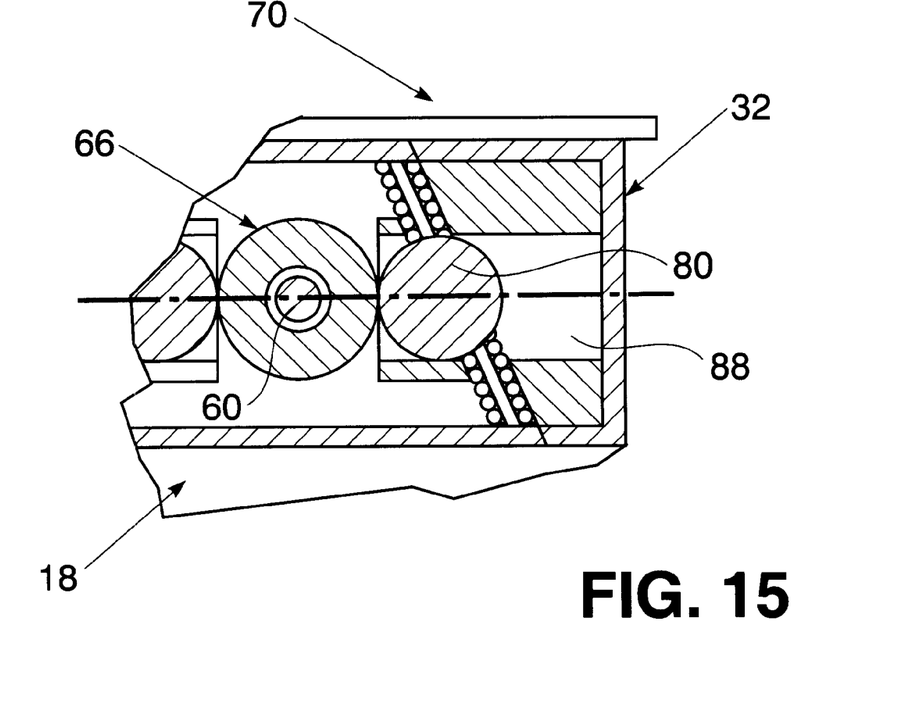
FIG. 15 is a section view taken substantially through a plane indicated by section line 15—15 in FIG. 14.

The two balls 80 associated with each of the joint locking mechanisms 46 are laterally displaced from their retracted positions as shown in FIGS. 10–12, to extended locking positions projecting from the housing side walls 34 by axial displacement of the wedge element 66 into abutment with the stop disc 64 as shown in FIGS. 11 and 14. In such extended locking positions, the balls 80 are received within sockets 88 formed in the receptors 32 of the female connector 20, thereby establishing firm interlocked joint relationship between the platform modules 16. Such establishment of the platform module joints is effected by manually applying a wrench to the projecting camshaft actuators 62, so as to impart rotation to the camshafts 60 as hereinbefore explained. Similarly, the module joints may be manually disengaged by rotation of the camshafts 60 in the opposite direction.

Figure 16:
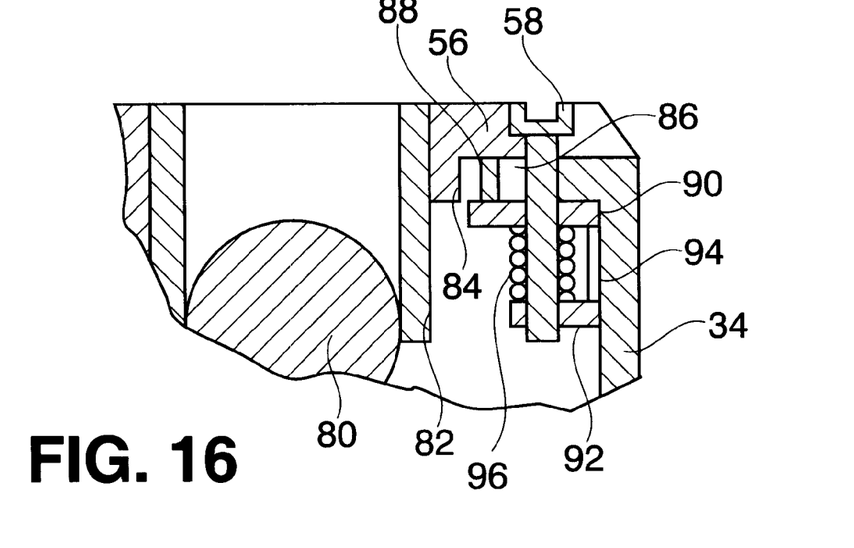
FIG. 16 is a partial section view taken substantially through a plane indicated by section line 16—16 in FIG. 7.

Locking movement of the balls 80 is guided through the sleeves 82 which are fixed to each of the side plates 56 at their flanges 84, so as to be adjustably positioned as aforementioned, for proper alignment of the ball guiding sleeves 82. Such adjustable positioning of the side plates 56 is readily achieved through adjustable fastening thereof to the side walls 34 by the bolts 58 as shown in FIG. 16. Thus, each of the bolts 58 adjacent each of the four corners of the end plate 56 extends through a lateral adjustment slot 86 formed in flanges 88 at each end of the side walls 34. The threaded end portion of each bolt 58 slidably projects through a washer 90 and threadedly engages a pressure adjusting element 92 rotationally fixed to and slidably displaceable relative to the side wall 34 through a groove 94 formed therein. A coil spring 96 is disposed on the threaded portion of the bolt 58 between the pressure element 92 and the washer 90 so as to exert an axial pressure on the washer 90 for clamping the side plate 56 between the head of the bolt 58 received therein and the washer 90. Thus, the pressure of spring 96 may be reduced by rotation of the bolt 58 in one direction causing axial displacement of the pressure element 92 away from the washer 90 for fastening release of the side plate 56 from its side wall 34, so as to accommodate adjustable shift of the side plate 56 with the ball guiding sleeve 82 fixed thereto. The bolt 58 may then be rotated in the other direction to axially displace the pressure element 92 toward the washer 90 so as to increase the axial pressure exerted by the spring 96 on the washer 90 and thereby firmly clamp the side plate 56 in a position corresponding to the proper adjusted position of the sleeve 82.

It will be apparent from the foregoing description that assembly and disassembly of the load transport platform 14 may be readily achieved by manual use of tools such as wrenches, externally applied to the projecting camshaft actuators 62. Further, assembly of the platform modules 16 is effectively achieved by establishment of firm joints therebetween through the joint locking mechanisms 46 after adjustably positioning of the sleeves 82 through the side plate bolts 58.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a load transport system having a platform assembled from a plurality of modules connected to each other by joints, means for establishing said joints comprising: male connectors projecting from each of the modules; female sockets projecting from each of said modules in alignment with the male connectors; and selectively controlled locking means within each of said male connectors for projection therefrom into the female sockets in alignment therewith to establish the joints when the male connectors are received within the female sockets.

2. The combination as defined in claim 1, wherein the selectively controlled locking means comprises: a camshaft rotatably mounted in axially fixed position within the male connector; a plurality of balls; means slidably mounting said balls for lateral displacement relative to the camshaft between retracted and extended positions relative to the male connector; and wedge means mounted on the camshaft for effecting said lateral displacement of the balls in response to rotation of the camshaft, whereby the joints are firmly established by the balls projecting into the female sockets in their extended positions.

3. The combination as defined in claim 2, including means attached to the camshaft for externally imparting said rotation thereto under manual control.

4. The combination as defined in claim 3, wherein said wedge means comprises: a tubular element slidably mounted on the camshaft having laterally extending camming ribs in engagement with the balls; and sleeve means in threaded engagement with the camshaft within the tubular element for translating said rotation of the camshaft into axial displacement of the tubular element causing said lateral displacement of the balls by the camming ribs.

5. The combination as defined in claim 2, wherein said wedge means comprises: a tubular element slidably mounted on the camshaft having laterally extending camming ribs in engagement with the balls; and sleeve means in threaded engagement with the camshaft within the tubular element for translating said rotation of the camshaft into axial displacement of the tubular element causing said lateral displacement of the balls by the camming ribs.

6. The combination as defined in claim 2, including means attached to the camshaft for externally imparting said rotation thereto under manual control.

7. The combination as defined in claim 1, wherein each of said male connectors comprises: an elongated housing having side walls with openings through which the locking means projects into the female sockets; and backing means secured to said housing for attachment thereof to the module.

8. The combination as defined in claim 7, wherein the selectively controlled locking means comprises: a camshaft rotatably mounted within the housing; a plurality of balls; guide means slidably mounting the balls within the housing in alignment with the openings in the side walls for projection therefrom into the female sockets; and wedge means mounted on the camshaft for effecting said projection of the balls in response to rotation of the camshaft, whereby the joints are firmly established.

9. In combination with a load transport system having a platform assembled from modules connected to each other by joints; means for establishing each of said joints including: an elongated connector housing having side walls; backing means secured to the housing for attachment thereof to a respective one of said modules; and selectively controlled locking means for projection through the side walls of the housing to establish the joints.

10. The combination as defined in claim 9, wherein the selectively controlled locking means comprises: a camshaft rotatably mounted within the housing; a plurality of balls; guide means slidably mounting the balls within the housing for projection therefrom through the side walls; and wedge means mounted on the camshaft for effecting said projection of the balls in response to rotation of the camshaft, whereby the joints are firmly established.

11. The combination as defined in claim 10, wherein said guide means comprises: sleeves through which the balls are respectively displaced; side plates to which the sleeves are fixed; and fastening means for releasably clamping the sleeves to the side walls in adjusted positions.

\* \* \* \* \*